Patented Feb. 28, 1928.

1,660,884

UNITED STATES PATENT OFFICE.

ARTURO AMENABAR OSSA, OF SANTIAGO, CHILE.

PROCESS OF MANUFACTURING METALS AND CHEMICALS BY MEANS OF IODINE.

No Drawing. Application filed February 4, 1921. Serial No. 442,540. Renewed July 14, 1927.

I have discovered that the principles involved in the invention patented under No. 1,343,153 and issued to me on June 8th, 1920, known as "process of extracting copper", i. e. the application of iodine to the extraction of copper from its ores, and its precipitation from its solutions, can be extended to other fields, by simple adaptations of the same chemical reactions to these other purposes, or by slightly modifying them, as will be explained hereafter.

The chemical equations, upon which said patent is based, are the following:

(1) $2CuO + 2H_2SO_4 = 2CuSO_4 + 2H_2O$
(2) $SO_2 + 2CuSO_4 + 2H_2O + 2HI = Cu_2I_2 + 3H_2SO_4$
(3) $Cu_2I_2 + O_2 = 2CuO + I_2$
(4) $2H_2O + SO_2 + 2I = H_2I_2 + H_2SO_4$

Equation No. 3 can also be written in the form given in the specifications of the patent, namely:

(5) $Cu_2I_2 + nCuO + O_2 = (N+2)CuO + I_2$ inasmuch as the presence of an excess of oxygen, probably present in the form of oxide of copper, seems to facilitate the reaction.

I have found that these reactions can be carried out in manifold ways.

Applications I and II.

To begin with, the copper oxide (CuO) or the iodide ($Cu_2I_2$) can be marketed directly, or can be used in the manufacture of a variety of copper salts, especially copper sulphate, by treating them with the suitable acids and other chemicals.

Or the oxide can be readily converted into metallic copper, by the well-known reduction process, with carbonaceous or other reducing materials, to wit:

(6) $2CuO + C = 2Cu + CO_2$

Application III.

In the second place, I have found that the cycle of operations, represented by Equations Nos. 1–4, can be employed for the manufacture of sulphuric acid, since two molecules of this acid are produced, according to Equations Nos. 2 and 4, over and in excess of the quantities required for the solution of the copper oxide called for in Equation No. 1. This excess is available, either directly for marketing as such, or for other operations, in the diluted form in which it is produced, or can be converted into concentrated acid, by a simple evaporation process.

It stands to reason that any other metal, soluble in acid and precipitated by iodine in solid form from aqueous solutions, like bismuth, mercury, silver, and the like, can be substituted for the copper in the reactions, without difficulty.

Application IV.

It is equally easy to apply these reactions to the refining of impure or black copper—with simultaneous generation of an excess sulphuric acid—producing a metal singularly free from impurities, since the copper oxide, from which the metallic copper is obtained, is practically chemically pure. Similarly, other metals, soluble in acid and forming insoluble compounds with iodine in aqueous solutions, like bismuth, mercury, silver, and the like, can be submitted to the same refining process with simultaneous production of excess sulphuric acid.

Application V.

There is no reason why the same reactions cannot be used for the refining of impure iodine, replacing the present methods, which principally rely on sublimation, as the iodine refining can be combined with any one of the other applications secured by this patent, the only requirement being that, after each cycle, the refined iodine obtained from a cycle be replaced by a new portion of impure iodine, instead of having the same portion circulate indefinitely through the apparatus.

Application VI.

Instead of recovering the iodine from the metal iodide by means of oxygen, with simultaneous production of metal oxide, as illustrated for copper in Equation No. 5, the separation may be accomplished by means of a hydroxide of an alkali, or one of its salts with a weak acid like carbonic acid, producing an alkali iodide and cuprous oxide, as shown for copper and sodium, respectively, in the following equations:

(7) $Cu_2I_2 + 2NaHO = 2NaI + Cu_2O + H_2O$
(8) $Cu_2I_2 + Na_2CO_3 = 2NaI + Cu_2O + CO_2$

Application VII.

The same purpose of producing alkali iodides can be accomplished, without intervention of a metallic oxide, by treating the hydroiodic acid obtained from Equation No. 4 directly with a hydroxide of an alkali, or one of its salts with a weak acid, like carbonic acid, according to the following equations:

(9)  $2HI + 2NaHO = 2NaI + 2H_2O$
(10) $2HI + Na_2CO_3 = 2NaI + H_2O + CO_2$

Application VIII.

In some cases the iodide of an alkaline earth can advantageously replace the hydroiodic acid in the cycle of Operations Nos. 1–5, and accomplish the same purposes described under Applications I, II, IV and V. In this variant the following reactions take the place of Nos. 2 and 3 previously described:

(11) $2CuSO_4 + SO_2 + CaI_2 + H_2O = Cu_2I_2 + CaSO_4 + 2H_2SO_4$
(12) $Cu_2I_2 + CaO = Cu_2O + CaI_2$

In carrying out this scheme, quicklime (CaO) is employed in No. 11, to recover the copper from the iodide as oxide, and calcium iodide is formed for the precipitation of a new portion of copper dissolved from the ore, or from any other source, with the acid regenerated in the same reaction (No. 10) for another cycle. Copper iodide results, which is used for the production of copper oxide and a new portion of alkali iodide. Thus, a complete cycle is established, as in Equations Nos. 1–4.

Application IX.

The conversion of copper oxide, produced by Equations Nos. 1–4, or any other of the oxides of metals described in Applications III and IV, into their metallic state, instead of using the well-known reduction process with carbonaceous or other reducing matter (Equation No. 6) can be profitably accomplished by means of metallic zinc, or any other metal more electro-positive than the metal in the respective oxides, in its combination with iodine, under simultaneous production of an oxide of the more electro-positive metal and elemental iodine.

The reactions take place in the following manner:

(13) $Cu_2I_2 + Zn = ZnI_2 + 2Cu$
(14) $ZnI_2 + O = ZnO + I_2$

It is clear that in this fashion chemically pure zinc oxide, iron oxide, or other similar oxides, suitable for paints and other purposes, can be obtained from impure metals, in combination with the manufacture, or refining of copper, bismuth, mercury, silver, or the like, the refining of impure iodine, and any other application that these reactions lend themselves to.

Application X.

The last application is capable of another variant, substituting for the oxygen in Equation No. 13 a hydroxide of an alkali, or a salt of an alkali with a weak acid, like carbonic acid. The resulting product in this case is a salt of the metal and the acid, instead of metal oxide, on the one hand, and an alkali iodide on the other. The reactions are represented by the following equations:

(15) $ZnI_2 + Na_2CO_3 = 2NaI + ZnCO_3$
(16) $ZnI_2 + 2NaOH = Zn(OH)_2 + 2NaI$

Application XI.

The decomposition of the alkali-iodide formed in any of the foregoing reactions can be procured, with simultaneous production of metallic iodine and caustic alkali, by means of an oxidizing agent like dioxide of manganese, with regeneration of the latter, as follows:

(17) $Na_2I_2 + MnO_2 + O_2 = I_2 + Na_2MnO_4$
(18) $Na_2MnO_4 + H_2O = MnO_2 + 2NaHO + O$

Accordingly, I claim:

1. A cyclic process which comprises treating a material containing a heavy metal soluble in sulfuric acid and forming insoluble iodids with iodine in the presence of sulfurous acid and water whereby metal iodid is formed, treating said metal iodid with a more electropositive metal whereby the iodid of said more electropositive metal is formed, treating the last-named iodid to recover the iodine, and returning the recovered iodine to the process.

2. A cyclic process comprising treating a material containing a heavy metal soluble in sulfuric acid and forming insoluble iodids with iodine in the presence of sulfurous acid and water whereby heavy metal iodid is formed, reducing said metal iodid to metal by means of a more electropositive metal whereby the iodid of said more electropositive metal is formed, treating said last named iodid with an alkali whereby alkali metal iodid is formed, treating the alkali iodid with an oxidizing agent whereby iodine is regenerated, and returning the iodine to the process.

In testimony whereof I affix my signature.

ARTURO AMENABAR OSSA.